United States Patent
Uriu et al.

(10) Patent No.: US 9,731,479 B2
(45) Date of Patent: *Aug. 15, 2017

(54) DISPLAY DEVICE AND MANUFACTURING METHOD THEREFOR

(71) Applicant: Panasonic Intellectual Property Management Co., Ltd., Osaka (JP)

(72) Inventors: Eiichi Uriu, Osaka (JP); Kenji Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/914,336

(22) PCT Filed: Aug. 8, 2014

(86) PCT No.: PCT/JP2014/004141
§ 371 (c)(1),
(2) Date: Feb. 25, 2016

(87) PCT Pub. No.: WO2015/029349
PCT Pub. Date: Mar. 5, 2015

(65) Prior Publication Data
US 2016/0221306 A1   Aug. 4, 2016

(30) Foreign Application Priority Data
Aug. 30, 2013   (JP) .................................. 2013-179947

(51) Int. Cl.
*B32B 3/00*       (2006.01)
*B32B 17/06*      (2006.01)
(Continued)

(52) U.S. Cl.
CPC .............. *B32B 17/064* (2013.01); *B32B 7/12* (2013.01); *B32B 17/06* (2013.01);
(Continued)

(58) Field of Classification Search
CPC ......... B32B 7/12; B32B 17/06; B32B 17/064; B32B 2307/412; G02F 1/13338;
(Continued)

(56) References Cited

U.S. PATENT DOCUMENTS

| 2008/0153377 A1 | 6/2008 | Kobayashi et al. |
| 2009/0218034 A1 | 9/2009 | Kawabe |

(Continued)

FOREIGN PATENT DOCUMENTS

| JP | 2000-067765 A | 3/2000 |
| JP | 2007-213045 A | 8/2007 |

(Continued)

OTHER PUBLICATIONS

International Search Report for corresponding International Application No. PCT/JP2014/004141 mailed Nov. 11, 2014.
Form PCT/ISA/237 for corresponding International Application No. PCT/JP2014/004141 dated Nov. 11, 2014.

*Primary Examiner* — Elizabeth Mulvaney
(74) *Attorney, Agent, or Firm* — Renner, Otto, Boisselle & Sklar, LLP

(57) ABSTRACT

A display device includes a transparent laminated body 6 formed of transparent substrates 1 that are arranged in layers; an image display body 2 that faces the transparent laminated body 6; and a resin layer 3 that is disposed between the transparent laminated body 6 and the image display body 2 and is made of a photo-curable resin. The transparent substrates 1 are bonded with a thermal adhesive film 5. The thermal adhesive film 5 has optical transmittance of 50% or more at wavelength of 395 nm and optical transmittance of 10% or less at wavelength of 365 nm.

6 Claims, 9 Drawing Sheets

(51) Int. Cl.
*G09F 19/22* (2006.01)
*B32B 7/12* (2006.01)
*B32B 37/12* (2006.01)
*B32B 37/18* (2006.01)
*G02F 1/1333* (2006.01)
*G02F 1/1335* (2006.01)

(52) U.S. Cl.
CPC ........ *B32B 37/1207* (2013.01); *B32B 37/182* (2013.01); *G02F 1/133308* (2013.01); *G09F 19/226* (2013.01); *B32B 2307/412* (2013.01); *B32B 2457/20* (2013.01); *G02F 1/133502* (2013.01); *G02F 2001/133331* (2013.01); *G02F 2202/28* (2013.01)

(58) Field of Classification Search
CPC ......... G02F 1/133305; G02F 1/133308; G02F 1/133502
See application file for complete search history.

(56) References Cited

U.S. PATENT DOCUMENTS

| | | |
|---|---|---|
| 2012/0114901 A1 | 5/2012 | Uraji et al. |
| 2016/0083282 A1* | 3/2016 | Jouanno ................ B32B 17/061 |
| | | 156/102 |
| 2016/0202842 A1* | 7/2016 | Uriu ........................ G06F 3/044 |
| | | 345/175 |

FOREIGN PATENT DOCUMENTS

| | | |
|---|---|---|
| JP | 2008-158251 A | 7/2008 |
| JP | 2009-192792 A | 8/2009 |
| JP | 2009-205065 A | 9/2009 |
| JP | 2010-008450 A | 1/2010 |
| JP | 2012-101975 A | 5/2012 |
| JP | 2012-158688 A | 8/2012 |
| WO | WO 2007/083500 A1 | 7/2007 |

* cited by examiner

(12) United States Patent

DISPLAY DEVICE AND MANUFACTURING METHOD THEREFOR

TECHNICAL FIELD

A display device and a manufacturing method therefor will be disclosed. Specifically, display device including a transparent laminated body formed of transparent substrates that are arranged in layers will be disclosed.

BACKGROUND ART

Display devices in which a cover glass is placed on a front surface of a display panel are known. As a result of providing the cover glass, the display panel can be protected, and design of display device can be improved.

Strength and safety of display devices have been improved by a cover glass being multi-layered (refer to JP 2010-008450 A, for example). When the cover glass is configured by a so-called laminated glass in which plates of glass are stacked, the strength of the cover glass improves. Also, with such a laminated glass, even when the glass is broken or clacked, scattering of pieces of broken glass can be suppressed by an adhesive that bonds the glass, and as a result safety is improved.

In the cover glass including layers, like the laminated glass on the market, films that express adhesiveness due to heat can be used as a middle film for bonding glass. In films that express adhesiveness due to heat, a film whose transmittance of ultraviolet light is reduced has been commonly used. This is because this type of thermal adhesive film is used in building applications and automotive applications, and it is preferable that the ultraviolet light is not transmitted therethrough. The ultraviolet light cutting off function is often realized by an ultraviolet absorbent being contained in the thermal adhesive film. This type of thermal adhesive film is designed such that the optical transmittance at a wavelength of 365 nm is decreased as much as possible, using the wavelength of 365 nm as a reference.

However, in order to suppress a double reflection of an image, resin can fill a space between the cover glass and the display panel. This resin can be formed of a photo-curable resin. In this case, when the above thermal adhesive film is used for bonding the cover glass, there is concern that the thermal adhesive film cuts out light of a wavelength with which the photo-curable resin is cured, and the photo-curable resin is not favorably cured.

SUMMARY

An object of the present disclosure is to provide a display device in which photo-curable resin is favorably cured and a double reflection of an image is suppressed and that has superior visibility. An object of the present disclosure is to manufacture a display device in which photo-curable resin is favorably cured and a double reflection of an image is suppressed and that has superior visibility.

A display device will be disclosed. The display device includes a transparent laminated body formed of two or more transparent substrates that are arranged in layers, an image-display body that faces the transparent laminated body, and a resin layer that is disposed between the transparent laminated body and the image-display body. The resin layer is made of a photo-curable resin. Two or more transparent substrates are bonded with a thermal adhesive film. The thermal adhesive film has optical transmittance of 50% or more at wavelength of 395 nm and optical transmittance of 10% or less at wavelength of 365 nm.

A display device manufacturing method will be disclosed. The display device manufacturing method includes a transparent substrate disposition step, a bonding step, and a resin curing step. In the transparent substrate disposition step, two or more transparent substrates are disposed in layers with a thermal adhesive film, having optical transmittance of 50% or more at wavelength of 395 nm, located therebetween. In the bonding step, two or more transparent substrates are bonded by heating and pressurization and a transparent laminated body is formed. In the resin curing step, the transparent laminated body and an image-display body are stacked in layers with a photo-curable resin located between the transparent laminated body and the image-display body, and the photo-curable resin is cured by being provided with light from a side of the transparent laminated body.

The display device that will be disclosed is a device in which photo-curable resin is favorably cured and a double reflection of an image is suppressed and that has superior visibility as a result of bonding with a thermal adhesive film having optical transmittance of 50% or more at wavelength of 395 nm.

BRIEF DESCRIPTION OF THE DRAWINGS

FIG. 1A is a cross-sectional view, FIG. 1B is a plan view;

FIG. 2A illustrates an example of a device including a resin layer, and FIG. 2B illustrates an example of a device not including a resin layer;

DETAILED DESCRIPTION

Figure 1A:
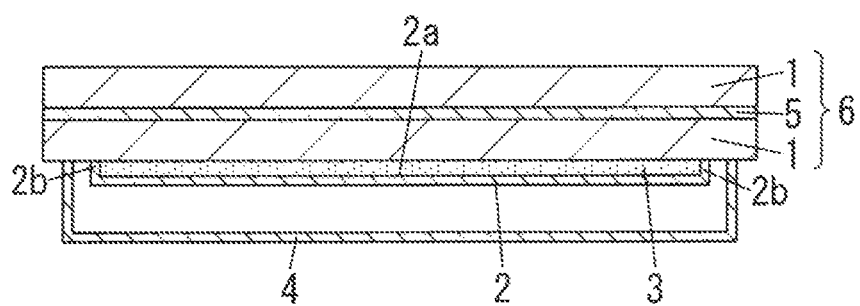
FIGS. 1A and 1B illustrate an example of a display device.

A display device will be disclosed. The display device includes a transparent laminated body 6, an image-display body 2, and a resin layer 3. The transparent laminated body 6 is formed of two or more transparent substrates 1 that are arranged in layers. The image-display body 2 faces the transparent laminated body 6. The resin layer 3 is disposed between the transparent laminated body 6 and the image-display body 2. The resin layer 3 is made of a photo-curable resin. Two or more transparent substrates 1 are bonded with a thermal adhesive film 5. The thermal adhesive film 5 has optical transmittance of 50% or more at wavelength of 395 nm and optical transmittance of 10% or less at wavelength of 365 nm.

In the display device, as a result of bonding with the thermal adhesive film 5 having optical transmittance of 50% or more at wavelength of 395 nm, photo-curable resin is favorably cured. As a result of providing a resin layer 3 that is cured photo-curable resin, a double reflection of an image can be suppressed. Therefore, the display device that has superior visibility can be obtained. Also, as a result of bonding with the thermal adhesive film 5 having optical transmittance of 10% or less at wavelength of 365 nm, entering of ultraviolet light on the short wavelength to the inside can be suppressed, and thus deterioration of the device can be suppressed.

Figure 1B:
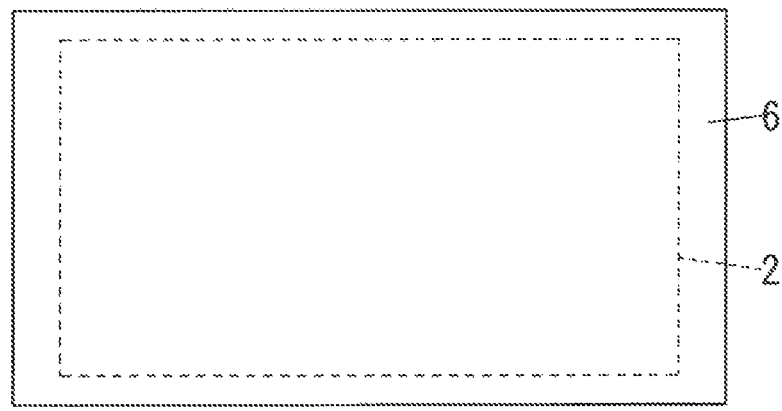

FIGS. 1A and 1B show an example of a display device. FIG. 1A is a cross-sectional view of the entire display device. FIG. 1B is a plan view of the display device when viewed from a side of the transparent laminated body 6 in direction vertical to a surface of the transparent laminated body 6. Note that, in the diagrams, the thickness of the layers and the sizes of the members are appropriately changed so as to make the device configuration easy to understand. In an actual device, the thickness and the size may be different from those of the diagrams. The same applies to the subsequent diagrams.

The image-display body 2 is a device having a function of displaying an image. The image-display body 2 functions as a display panel. The image-display body 2 displays a planar image. An image displayed on the image-display body 2 can be viewed from the outside through the transparent laminated body 6. A surface of the image-display body 2 on the side of the transparent laminated body 6 is an image display surface. The image-display body 2 includes a display portion that performs image display. The display portion may be composed of a liquid crystal display, an LED display, an organic EL display, a plasma display, or the like. The display portion is provided such that an image is displayed on the image display surface. In FIG. 1B, an outer edge of the image-display body 2 is shown by broken lines, and manner in which the image-display body 2 can be viewed through the transparent laminated body 6 and the resin layer 3 that are transparent members is illustrated.

In the example shown in FIG. 1A, the image-display body 2 is provided with a frame portion 2b that projects from a periphery thereof toward the transparent laminated body 6. The frame portion 2b may be provided expanding the entire periphery of the image-display body 2. As a result of providing the frame portion 2b, a recess 2a is formed in the image-display body 2. As a result of providing the recess 2a, resin can easily fill the space between the image-display body 2 and the transparent laminated body 6. In this case, the frame portion 2b functions as a spacer. The frame portion 2b may be composed of an appropriate member such as a resin molded body. The frame portion 2b may be joined to the transparent laminated body 6 at an end portion thereof. The image display surface is formed of a bottom surface of the recess 2a.

The image-display body 2 is preferably provided with a back light structure. A back light has a function to radiate light toward the display portion. The light from the back light is radiated to the outside through the display portion composed of a liquid crystal display (LCD) or the like. As a result of providing the backlight, an image shown in the image-display body 2 can be displayed more brightly to the outside. The back light structure may be formed of a stacked structure in which a light portion composed of an LED or the like, a light guide plate, an LCD, a color filter, and a polarizing plate are stacked from the back surface in the stated order, for example.

In the example shown in FIGS. 1A to 1B, the image-display body 2 is housed in a casing 4 that is joined to a periphery portion of the transparent laminated body 6. By using the casing 4, the members housed inside the casing 4 such as the image-display body 2 can be protected. In a housing portion of the casing 4, a controller configured to control the image display and the like may be provided.

The transparent laminated body 6 is formed of two or more transparent substrates 1. Two or more transparent substrates 1 are bonded with the thermal adhesive film 5. The transparent laminated body 6 is formed by stacking two or more transparent substrates 1. As a result of using the transparent laminated body 6, protection performance can be improved. That is, as a result of a substrate protecting the inside being multi-layered, the strength and safety can be improved. Since two or more transparent substrates 1 are bonded with the thermal adhesive film 5, two or more transparent substrates 1 can be easily bonded with high positional accuracy. Accordingly, the display device that has superior appearance and is well-designed can be obtained.

The transparent substrates 1 can be composed of a transparent planar substrate. The transparent substrates 1 may have a plate-like, film-like, or sheet-like shape. By using the transparent substrates 1, the image-display body 2 can be protected. Glass is preferably used as the transparent substrates 1. As a result of the transparent substrates 1 being made of glass, transparency can be improved, and thus visibility of an image display can be improved, and also the image-display body 2 can be favorably protected. In the case where the transparent substrates 1 are made of glass, the transparent substrates 1 are a so-called cover glass. A preferable mode of the transparent substrates 1 is a glass plate. The transparent substrate 1 may be made of resin. Note that, in the case where the transparent substrates 1 are made of resin, resin having high hardness and transparency is preferable. For example, the transparent substrates 1 can be made of polycarbonate. Note that a protection layer may be provided on the outside surface of the transparent substrates 1, that disposed outside. With the protection layer, protection performance is improved and scratching of the surface of the transparent substrate 1 can be suppressed. The protection layer can be made of a resin film or the like.

When two or more transparent substrates 1 are made of glass, the transparent laminated body 6 can be configured by a so-called laminated glass in which two or more plates of glass are stacked. In this case, the transparent laminated body 6 is a cover glass. By using the laminated glass, the strength of the cover glass improves. Also, with such a laminated glass, even when the glass is broken or cracked, scattering of pieces of broken glass can be suppressed by the adhesive that bonds the glass plates together, and as a result safety is improved.

Also, the transparent laminated body 6 may be formed by a transparent substrates 1 made of glass and a transparent substrate 1 made of resin being bonded with the thermal adhesive film 5. In this case, the transparent substrate 1 made of glass is preferably disposed inside (a side of the image-display body 2). That is, the transparent substrate 1 made of resin is disposed outside. As a result of forming the transparent laminated body 6 with a complex substrate made of glass and resin, the strength and safety can be favorably improved. Resin having high strength is preferable in order to suppress scratching. For example, polycarbonate can be used as a resin used for the transparent substrates 1 that is included in the transparent laminated body 6.

Thickness of each of the transparent substrates 1 is not specifically limited, but thickness of each of the transparent substrates 1 is preferably 4 to 6 mm, for example. When the transparent substrates 1 have such thickness, the transparent laminated body 6 can be obtained easily. Of course, thickness of each of the transparent substrates 1 may be 6 mm or more. The transparent substrates 1 forming the transparent laminated body 6 may have same thickness, or may have different thickness. In the case where two or more transparent substrates 1 made of same material are stacked, the same thickness with the transparent substrates 1 contributes easier manufacturing. Also, thickness of the transparent laminated body 6 is not specifically limited. For example, the thickness of the transparent laminated body 6 may be 5 to 50 mm, preferably 8 to 20 mm.

In the display device, two or more transparent substrates 1 are bonded with the thermal adhesive film 5. After bonding, the thermal adhesive film 5 forms a layer of the thermal adhesive film 5. The layer of the thermal adhesive film 5 may be a layer formed of the thermal adhesive film 5 that is, after being heated to be softened and express adhesiveness, cooled to be hardened. The layer of the thermal adhesive film 5 is defined as an adhesive layer. The adhesive layer formed of the thermal adhesive film 5 is disposed between an outside of the transparent substrate 1 and an inside of the transparent substrate 1.

The thermal adhesive film 5 is made of a film material that expresses adhesiveness due to being heated. The thermal adhesive film 5 is a film-like molded body. The thermal adhesive film 5 does not have adhesiveness before being heated (before use). The thermal adhesive film 5 is softened by being heated and express adhesiveness. The thermal adhesive film 5 may be melted when heated. The adhesive layer is formed of the thermal adhesive film 5. The thermal adhesive film 5 can be made of a thermoplastics resin film, for example. Also, the thermal adhesive film 5 can be made of a film that is made of an addition polymerizable monomer or resin. As a result of using the thermal adhesive film 5, two or more transparent substrates 1 can be stuck easily. As a result, the display device having superior visibility and being well-designed can be constructed. Note that although the state of the thermal adhesive film 5 after being heated may be different from the state before heated, the adhesive layer formed of the thermal adhesive film 5 is given the reference numeral 5 in the diagram to facilitate understanding. Accordingly, the adhesive layer formed of the thermal adhesive film 5 may be understood as "adhesive layer 5".

Here, in a display device having a large screen, there are cases in which bonding members together is difficult. For example, when a size of a display screen is 50 inches or more, or furthermore is 70 inches or more, it is not easy to perform bonding. It is conceivable that the bonding of members is performed with an optical clear adhesive (OCA) tape. However, the optical clear adhesive tape has adhesiveness in a normal state. Therefore, when the optical clear adhesive tape is used, re-bonding cannot be performed. And hence, members cannot be easily stuck. Also, in the optical clear adhesive (OCA) tape, it is generally difficult to stick two or more transparent substrates 1 that are thick. Since it is not possible to deflect the thick transparent substrate 1 itself, air is easily jammed when sticking, and bubbles easily remain at bonded surface of sticking. Therefore, sticking with sufficient reproducibility is extremely difficult. Also, in order not to spoil the appearance, it is preferable to bond each of members with high positional accuracy. However, in the optical clear adhesive tape, stacking members while aligning positions on a surface having adhesiveness is demanded, and re-bonding cannot be performed. Therefore, especially in the device having a large display area, it is difficult to stick with high positional accuracy. On the other hand, by using the thermal adhesive film 5, after members are aligned and stacked in a state in which the thermal adhesive film 5 do not express adhesiveness, the members can be bonded by the thermal adhesive film 5 being heated. Accordingly, in the case the thick transparent substrates 1 are used, sticking can be performed easily without air being jammed. Also, in the case where large transparent substrates 1 are used, alignment can be performed easily with high accuracy. As a result, the display device having superior visibility and being well-designed can be obtained. And also, even in thickness of each of the transparent substrates 1, for example, is 5 mm or more, furthermore is 10 mm or more, sticking can be favorably performed regardless of the thickness. Also, even in a large screen whose short side length is 0.5 m or more, or is 1 m or more in a rectangle screen, sticking of members can be easily performed with high positional accuracy. In a square screen, length of one side may be 0.5 m or more, or may be 1 m or more. Note that the upper limit of the size of a screen is not specifically limited, but length of one side may be 3 m or less, or may be 2 m or less in a rectangular or square screen, for example. Note that the shape of the screen of the display device is not limited to a quadrangle, but may be another polygon (such as a triangle, a hexagon, or an octagon), a circle, an ellipse, or the like.

The thermal adhesive film 5 expresses adhesiveness with heat, and bonds two transparent substrates 1 facing each other. The thermal adhesive film 5 may be electrically insulating. The thermal adhesive film 5 preferably becomes transparent after being heated. That is, the adhesive layer formed of the thermal adhesive film 5 is preferably transparent. Accordingly, an image can be displayed to the outside. The thermal adhesive film 5 may not be completely transparent before being heated. However, the thermal adhesive film 5 preferably has optical transparency, such a degree that an outline of an object that is disposed on an opposite film can be seen therethrough. Accordingly, alignment can be performed easily.

The resin layer 3 is provided between the transparent laminated body 6 and the image-display body 2. The resin layer 3 is made of resin that fills the space between the transparent laminated body 6 and the image-display body 2. As a result of the resin layer 3 being provided between the image-display body 2 and the transparent laminated body 6, double reflection of an image can be suppressed, and image display with superior visibility can be performed.

Figure 2A:
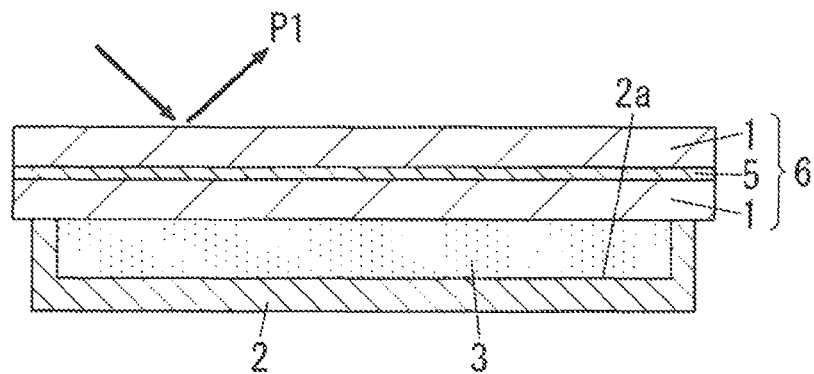
FIGS. 2A and 2B are cross-sectional views for illustrating reflection in the display device.
Figure 2B:
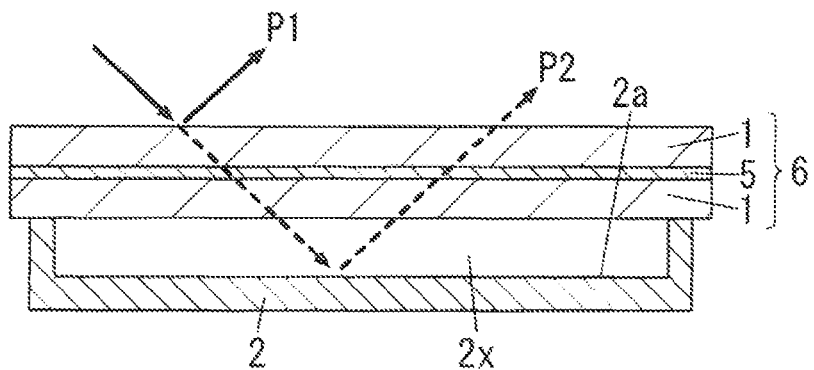

A mechanism of double reflection of an image and suppression thereof in the display device will be described with reference to FIGS. 2A and 2B. The double reflection of an image is caused by a mixture of surface reflection occurring on a surface of the transparent laminated body 6 (cover glass, for example) and secondary reflection occurring on a surface of the image-display body 2 (display panel, for example). In a configuration shown in FIG. 2B, resin does not fill the space between the transparent laminated body 6 and the image-display body 2, and the resin layer 3 is not formed. Accordingly, the space forms a space 2x. In this case, light traveling toward the transparent laminated body 6 from the outside becomes a light P1 due to surface reflection that is reflected on the surface of the transparent laminated body 6 and traveling toward the outside, and a light P2 due to secondary reflection that is reflected on the surface of the image-display body 2 and traveling toward the outside. Due to existence of the light P1 and the light P2, double reflection of an image occurs. If the resin layer 3 is provided between the transparent laminated body 6 and the image-display body 2, as shown in FIG. 2A, the reflection index of a medium that fills the space between the transparent laminated body 6 and the image-display body 2 becomes closed to that of the transparent laminated body 6. Accordingly, the light P2 due to the secondary reflection is suppressed and almost disappears, and the light P1 due to the surface reflection becomes dominant as the reflected light. As a result, generation of two or more reflected lights is suppressed and the double reflection of an image can be reduced.

The resin layer 3 is made of a photo-curable resin. The resin layer 3 can be easily formed by causing the photo-curable resin to be cured. The photo-curable resin is preferably resin having fluidity. In a preferable mode, the photo-curable resin is cured by an accretion reaction. It is preferable that the photo-curable resin does not generate volatile components or low molecular weight components such as water and low molecular weight alcohol at the time of being cured. The photo-curable resin whose volume changes before and after curing is smaller is more preferable. Accordingly, the filling ability by the resin layer 3 can be improved. The photo-curable resin is preferably an ultraviolet curable resin.

For example, the resin layer 3 can be formed by filling the space between transparent laminated body 6 and the image-display body 2 with the photo-curable resin and providing the photo-curable resin with light from a side of the transparent laminated body 6. The adhesive layer formed of the thermal adhesive film 5 preferably transmits light of a wavelength that causes the photo-curable resin to be cured. The resin layer 3 is preferably made of an adhesive resin. Accordingly, the image-display body 2 and the transparent laminated body 6 can be strongly bonded. Of course, if the frame portion 2b of the image-display body 2 and the transparent laminated body 6 are sufficiently fixed, the resin layer 3 need not have adhesiveness.

Next, a manufacturing method of a display device will be described.

The manufacturing method of the display device includes a transparent substrate disposition step, a bonding step and a resin curing step. The transparent substrate disposition step is a step in which two or more transparent substrates 1 are disposed in layers with the thermal adhesive film 5, having optical transmittance of 50% or more at wavelength of 395 nm, located therebetween. The bonding step is a step in which two or more transparent substrates 1 are bonded by heating and pressurization, and the transparent laminated body 6 is formed. The resin curing step is a step in which the transparent laminated body 6 and the image-display body 2 are stacked in layers with photo-curable resin located between the transparent laminated body 6 and the image-display body 2, and the photo-curable resin is cured by being provided with light from the side of the transparent laminated body 6.

In the manufacturing method of the display device, as a result of bonding with the thermal adhesive film 5 having optical transmittance of 50% or more at wavelength of 395 nm, photo-curable resin is favorably cured. As a result of providing the resin layer 3 that is cured photo-curable resin, a double reflection of an image is suppressed. Accordingly, the display device that has superior visibility can be manufactured.

Figure 3A:
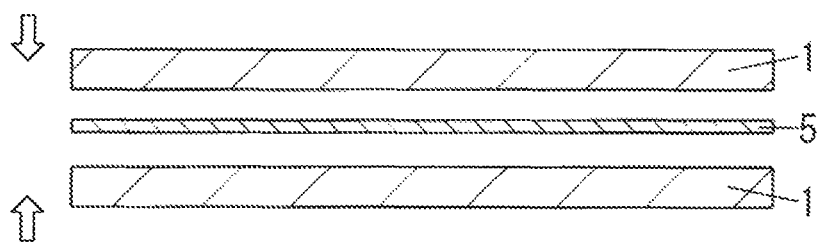
FIGS. 3A and 3B illustrate an example of a manufacturing method of the display device, and are cross-sectional views illustrating a manner in which a transparent laminated body is manufactured.
Figure 3B:
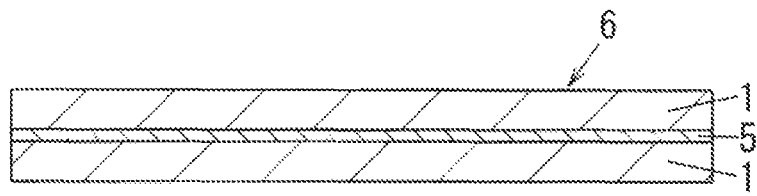

FIGS. 3A to 3B show an example of the manufacturing method of the display device, and a manner in which the transparent laminated body 6 is manufactured is illustrated. FIGS. 3A and 3B show the transparent substrate disposition step and the bonding step.

When the transparent laminated body 6 is manufactured, first, the thermal adhesive film 5 is arranged between one transparent substrate 1 and another transparent substrate 1, as shown in FIG. 3A. In a preferable mode, two or more transparent substrates 1, having same size, are stacked such that position of periphery portion aligns. Also, in another preferable mode, two or more transparent substrates 1, having different size each other, are used. For example, the outside of transparent substrate 1 can be slightly larger than the inside of that. Alignment marks may be provided in two or more transparent substrates 1. When alignment marks are provided, alignment of two or more transparent substrates 1 are performed easily. Alignment marks may be formed by printing, incising or the like. Also, as described below, when two or more transparent substrates 1 having a pattern are used, using this pattern to align can be performed.

The thermal adhesive film 5 does not have adhesiveness before being heated. Here, in the case where an adhesive tape or the like is used, when two or more transparent substrates 1 are layered, two or more transparent substrates 1 are bonded together by the adhesive tape, and as a result it is difficult to finely adjust positions of the transparent substrates 1 that are once layered. Thus, layering with high accuracy is required when bonding is performed, re-bonding of the transparent substrates 1 once layered is difficult, and therefore bonding of two or more transparent substrates 1 with high positional accuracy is not easy. On the other hand, in the case of using the thermal adhesive film 5, since the thermal adhesive film 5 does not have adhesiveness before being heated, finely adjusting positions of the transparent substrates 1 can be easily performed by individually moving the transparent substrates 1 horizontally (in a direction parallel to the surface of the transparent substrate 1) or the like, in a state in which two or more transparent substrates 1 are layered. As a result of this fine adjustment, alignment can be more reliably performed, and two or more transparent substrates 1 can be stacked and integrated by heating and pressurization in a state of being aligned. Accordingly, members are easily bonded with high positional accuracy, and the transparent laminated body 6 can be formed.

Then, as a result of heating and pressurizing them from both sides as shown by arrows in FIG. 3A, layered substrates are bonded together and integrated, and the transparent laminated body 6 includes two or more transparent substrates 1 can be formed, as shown in FIG. 3B. The heating and pressurization can be performed by a press. The press preferably uses a vacuum press. As a result of performing pressing under reduced pressure, substrates can be bonded with high adhesiveness. The pressing can be performed in a temperature range from 80 to 150° C. and in a period from 5 to 30 minutes, for example, but the temperature and the period are not limited there to.

Incidentally, although a method in which one thermal adhesive film 5 is disposed between two transparent substrates 1 in the above description, two or more thermal adhesive films 5 may be disposed between two or more transparent substrates 1. In this case, a thickness can be adjusted by the number of thermal adhesive films 5.

Figure 4A:
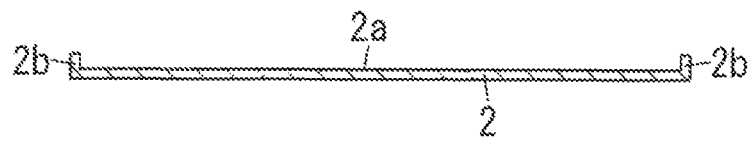
FIGS. 4A to 4D illustrate an example of a manufacturing method of the display device and are cross-sectional views.
Figure 4B:
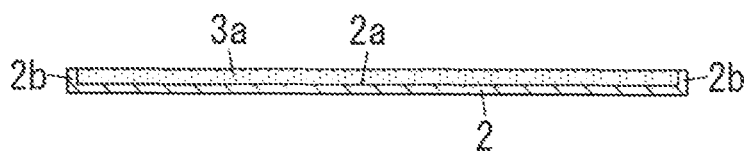
Figure 4C:
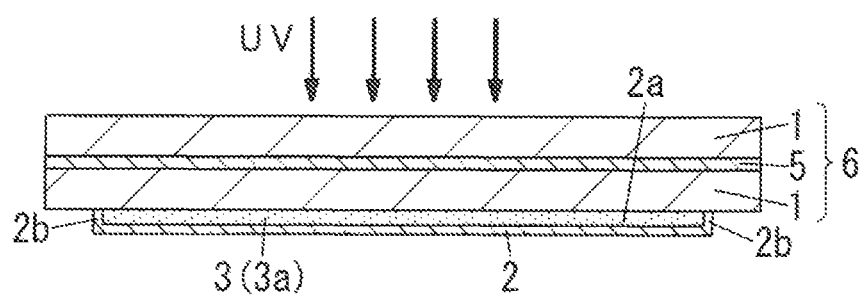

FIGS. 4A to 4D show an example of the manufacturing method of display device, and a manner in which the transparent laminated body 6 and the image-display body 2 are bonded together. FIG. 4C, of FIGS. 4A to 4D, illustrates the resin curing step.

When the transparent laminated body 6 and the image-display body 2 are bonded, first, the image-display body 2 shown in FIG. 4A is prepared. The image-display body 2 in which a display portion is made of liquid crystal or the like and a frame portion 2b is formed in the periphery portion can be used. The periphery portion 2b may protrude in a direction toward that in which an image is displayed.

Next, as shown in FIG. 4B, the recess 2a formed by the frame portion 2b is filled with a resin composition 3a. The resin composition 3a is made of a photo-curable resin. Here, the resin composition 3a is in a state of having fluidity, and fills the entire recess 2a.

Next, as shown in FIG. 4C, the transparent laminated body 6 and the image-display body 2 are stacked in layers with the photo-curable resin located therebetween. The transparent laminated body 6 faces the image-display body 2. The image-display body 2 is disposed such that an image display surface is on a side of the transparent laminated body 6. At this time, because the resin composition 3a has not being cured, the resin composition 3a adheres to the transparent laminated body 6, and filling ability improves. Also, positions of the transparent laminated body 6 and the image-display body 2 can be finely adjusted in the horizontal direction. Then, in a state in which the transparent laminated body 6 and the image-display body 2 are stacked in layers, the resin composition 3a is provided with light (such as UV light) from an outside of the transparent laminated body 6. FIG. 4C shows a manner in which ultraviolet (UV) light as a preferable mode of light is provided. As a result of the lighting, the photo-curable resin is cured, and the resin layer 3 is formed by the cured resin. Here, the thermal adhesive film 5 is formed such that light in a wavelength region with which the photo-curable resin is cured can pass therethrough. Accordingly, the resin is cured by the light that has passed through the thermal adhesive film 5. The thickness of the space between the image-display body 2 and the transparent laminated body 6 may be set to 1 to 10 mm, for example. Therefore, the resin layer 3 can be provided so as to have a thickness of approximately 1 to 10 mm. Note that, from the viewpoint of suppressing double reflection of an image, it is preferable that a difference between refractive indices of the resin layer 3 and the transparent laminated body 6 is smaller. The difference of absolute values thereof may be preferably less than 0.2, more preferably 0.1 or less, and further more preferably 0.05 or less, but is not limited thereto. Note that, in the case where the transparent laminated body 6 is formed of two or more transparent substrate 1 having a different refractive index each other, it is preferable that a difference between refractive indices of each of the transparent substrates 1 is smaller. For example, the difference of absolute values thereof may be preferably less than 0.2, more preferably 0.1 or less, and further more preferably 0.05 or less, but is not limited thereto.

Figure 4D:
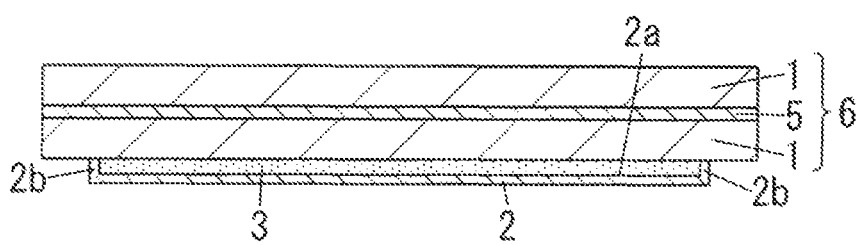

As shown in FIG. 4D, as a result of bonding between the transparent laminated body 6 and the image-display body 2, the display device including the transparent laminated body 6, the image-display body 2 and the resin layer 3 can be obtained. The transparent laminated body 6 and the image-display body 2 are preferably bonded by the resin layer 3. A structure in which the transparent laminated body 6 and the image-display body 2 are bonded in a planar manner is also referred to as direct bonding. Also, the frame portion 2b of the image-display body 2 and the transparent laminated body 6 may be fixed by a fixing means. The fixing means may be fixing by an adhesive, fixing by a fitting structure, or the like. The display device shown in FIG. 4D may be thereafter provided with other members such as the casing 4, an electric circuit that constitutes the controller and the like, as shown in FIGS. 1A and 1B.

Incidentally, although the step in which the photo-curable resin is disposed on the surface of the image-display body 2 on the side of the transparent laminated body 6 is shown as a step of disposing the resin was described above, the photo-curable resin may be disposed on a surface of the image-display body 2 on the side of the transparent laminated body 6. Alternatively, the photo-curable resin may be provided on both the surface of the image-display body 2 on the side of the transparent laminated body 6 and the surface of the transparent laminated body 6 on the side of the image-display body 2. Alternatively, after the transparent laminated body 6 and the frame portion 2b of the image-display body 2 are bonded, the photo-curable resin may be injected into a space formed between the transparent laminated body 6 and the image-display body 2. In short, as a result of the photo-curable resin being disposed between the transparent laminated body 6 and the image-display body 2, the resin layer 3 can be formed. The step of disposing resin is defined as a resin disposition step in which the photo-curable resin is disposed on at least one of the surface of the image-display body 2 on the side of the transparent laminated body 6 and the surface of the transparent laminated body 6 on the side of the image-display body 2. Note that, in order to improve the filling ability of the resin, it is preferable that the recess 2a is provided in the image-display body 2, and the recess 2a is filled with the photo-curable resin, as described above.

Here, the thermal adhesive film 5 has optical transmittance of 50% or more at a wavelength of 395 nm. Light of a wavelength with which the photo-curable resin is cured can pass through the thermal adhesive film 5, and strikes the photo-curable resin, and therefore the photo-curable resin can be easily cured. The optical transmittances of the thermal adhesive film 5 at a wavelength of 395 nm is more preferably 60% or more, and further more preferably 70% or more. Although the optical transmittance, strictly speaking, is a transmittance before bonding, in the case where the transmittance scarcely changes before and after bonding, it may be the transmittance of the thermal adhesive film 5 after being cured by heat.

The optical transmittance of the thermal adhesive film 5 at wavelength of 365 nm is preferably 10% or less. Light on the short wavelength side (ultraviolet light) can be cut by the thermal adhesive film 5, entering of ultraviolet light to the inside can be suppressed, and thus deterioration of the device can be suppressed. For example, in the case where the display device is installed in a location that may be exposed to ultraviolet light such as outdoors, there is concern that the degradation of the device advances due to the ultraviolet light, but the influence of the ultraviolet light can be reduced by cutting off the ultraviolet light. The optical transmittance of the thermal adhesive film 5 at wavelength of 365 nm is more preferably 5% or less, further more preferably 3% or less. Although the optical transmittance, strictly speaking, is a transmittance before bonding, in the case where the transmittance scarcely changes before and after bonding, it may be the transmittance of the thermal adhesive film 5 after being cured by heat.

The preferable mode of the thermal adhesive film 5 is such that the optical transmittance at a wavelength of 395 nm is preferably 50% or more, and the optical transmittance at a wavelength of 365 nm is 10% or less. Conventionally, in a film that express adhesiveness due to heat such as the thermal adhesive film 5, a film whose transmittance of ultraviolet is reduced has been commonly used. This type of thermal adhesive film is designed such that the optical transmittance at a wavelength of 365 nm is decreased as much as possible, using the wavelength of 365 nm as a reference. However, if the thermal adhesive film used in these applications is used as-is as the thermal adhesive films 5 for the display device, there is concern that the thermal adhesive film 5 cuts out light of a wavelength which the photo-curable resin is cured, and the photo-curable resin is not favorably cured. Many types of photo-curable resin are cured by ultraviolet light and light in a visible light region (wavelength of 410 nm or less, for example) close to ultraviolet light, and the thermal adhesive film 5 cuts off light whose wavelength is in the vicinity of 395 nm. Therefore, in the display device, the thermal adhesive film 5 whose optical transmittance at a wavelength of 395 nm is preferably 50% or more is used. Because the photo-curable resin that is cured with light of a wavelength of 395 nm or 405 nm exists, the resin is favorably cured with the light of this wavelength, and the resin layer 3 can be formed. Also, if the thermal adhesive film 5 whose optical transmittance at a wavelength of 365 nm is 10% or less is used, the ultraviolet light other than the light of a wavelength used for curing can be prevented from being transmitted as much as possible. Here, ultraviolet light of a shorter wavelength has a higher energy level and has more influence on the device than light of a long wavelength. Therefore, as a result of cutting off ultraviolet light of a short wavelength as much as possible, the negative influence due to ultraviolet light can be suppressed.

The thermal adhesive film 5 preferably contains at least one of an ethylene-vinyl acetate copolymer and polyvinyl butyral as a main component. The main component is a monomer that is to be a principal component of a polymer or a resin component. The ethylene-vinyl acetate copolymer is also referred to as EVA resin. The polyvinyl butyral is also referred to as PVB. When these resins are used, an adhesive layer that can transmit more light of a wavelength with which the photo-curable resin can be cured can be formed. Accordingly, the thermal adhesive film 5 whose optical transmittance of light at a wavelength of 395 nm is 50% or more can be more easily obtained.

The thermal adhesive film 5 preferably contains an ultraviolet absorbent. As a result of containing the ultraviolet absorbent, the thermal adhesive film 5 whose optical transmittance at a wavelength of 365 nm is 10% or less can be more easily obtained.

The thermal adhesive film 5 may contain an appropriate additive agent other than the main component that is made of at least one of an ethylene-vinyl acetate copolymer and polyvinyl butyral, and the ultraviolet absorbent. Examples of the additive agent include a polymerization initiator, a polymerization inhibitor, and the like. A specific example of the thermal adhesive film 5 includes "Melthene-G" (from Tosoh Corporation) for EVA, and Sentry Glass Expressions (registered trademark) from DuPont for PVB.

In the manufacturing the display device, light for curing is preferably light whose peak wavelength is in a range from 390 to 410 nm. Therefore, light can effectively pass through the thermal adhesive film 5, and the photo-curable resin can receive the light to be cured. The peak wavelength may be a value of the wavelength at which a peak having the highest height appears when relative values of light energy are depicted with respect to the wavelength in a graph. As a result of light having relatively short wavelength whose peak wavelength is 410 nm or less, curability can be improved, because the short wavelength light has a higher energy level. The light for curing more preferably has a peak wavelength in a range from 390 to 400 nm.

A light source of light for curing is not specifically limited, but may be a metal halide lamp, a UV lamp, a super-high pressure mercury lamp, or the like, for example. When the metal halide lamp is used, light to be emitted may have a peak in the vicinity of a wavelength of 405 nm in addition to the component in a wave length of 365 nm or less, and this light can be used for curing. When the super-high pressure mercury lamp is used, the light to be emitted may have peak in the vicinity of wavelengths of 405 nm (h line) and 436 nm (g line) in addition to the component in wavelengths of 400 nm or less, and this light can be used for curing. Also, an LED light source in a visible region can be used as the light source. In this case, an LED lamp having a peak wavelength of 405 nm (h line), in particular, can be preferably used.

The photo-curable resin preferably has a property of being cured with light at a wavelength of 410 nm or less. The photo-curable resin is cured when being provided with the light at a wavelength of 410 nm or less, and the resin layer 3 can be effectively cured. The photo-curable resin preferably has a property of being cured with light at a 405 nm, and more preferably has a property of being cured with light at a 395 nm. The photo-curable resin further more preferably is an ultraviolet curable resin. The ultraviolet curable resin is a resin having a property of being cured when being provided with ultraviolet light. Some ultraviolet curable resins have a property of being cured not only with ultraviolet light, but also with light in a wave length region of the visible light region that is close to ultraviolet light. By using such ultraviolet curable resins, even if the thermal adhesive film 5 suppresses ultraviolet light to some degree, curing can be performed effectively and the resin layer 3 can be formed. Therefore, the ultraviolet curable resin preferably has a property of being cured with light at a wavelength of 395 nm, and more preferably has a property of being cured with light at a wavelength of 405 nm. The photo-curable resin may be an ultraviolet curable resin "FINSET" (liquid type) from Hitachi Chemical Company, Ltd. or the like. Note that, the photo-curable resin may have a property of not being cured with light of a wavelength exceeding 450 nm, but the photo-curable resin is not limited thereto.

Figure 5:
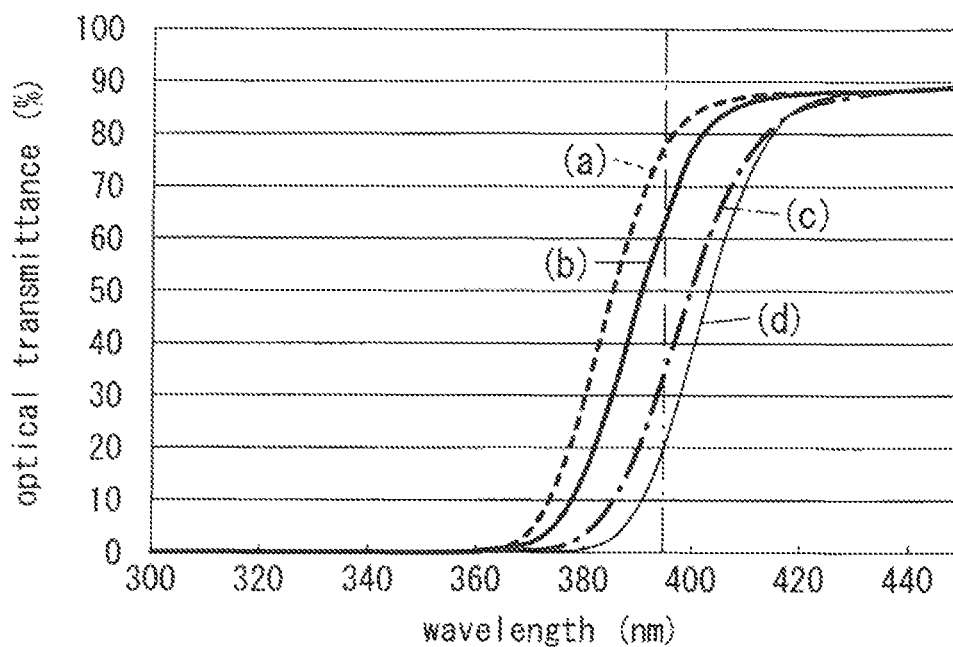
FIG. 5 is a graph illustrating an example of light-transmission characteristics of thermal adhesive films.

FIG. 5 is a graph illustrating an example of light-transmission property of the thermal adhesive film 5. In this graph, the horizontal axis shows light wavelength and the vertical axis shows optical transmittance. Curves denoted by (a) and (d) show optical transmittance of the thermal adhesive film 5 formed of resin whose main component is polyvinyl butyral. Curves denoted by (b) and (c) show optical transmittance of the thermal adhesive film 5 formed of resin whose main component is an ethylene-vinyl acetate copolymer. Each thickness of the films is 0.75 mm for (a) and (d), 0.3 mm for (b), and 0.8 mm for (c). The thermal adhesive film 5, of each of (a) and (b), has optical transmittance exceeding 50% at a wavelength of 395 nm. Light at a wavelength of 410 nm or less, specifically light at a wavelength of 395 nm (ultraviolet light) can pass therethrough, and the photo-curable resin can be cured. On the other hand, the thermal adhesive film, of each of (c) and (d), has optical transmittance below 40% at a wavelength of 395 nm, and therefore there is a concern that sufficient curability may not be obtained. The thermal adhesive film 5 is preferably made of resin that can transmit light at a wavelength of 395 nm as much as possible. Also, the thermal adhesive film, of each of (a) to (d), has optical transmittance below 10% at a wavelength of 365 nm. Therefore, an effect of cutting off ultraviolet light of short wavelength can be obtained. Accordingly, more preferable is the thermal adhesive film 5 of each of (a) and (b) that has relatively high optical transmittance at a wavelength of 395 nm and relatively low optical transmittance at a wavelength of 365 nm. Note that, the thermal adhesive film, of each of (c) and (b), has optical transmittance exceeding 60% at a wavelength of 410 nm, and thus curability may be considered to be improved, but the period required for curing may increase because the light energy decrease as the wavelength increase. With this in mind, the thermal adhesive film 5, of each of (a) and (b), is more preferable.

Figure 6:
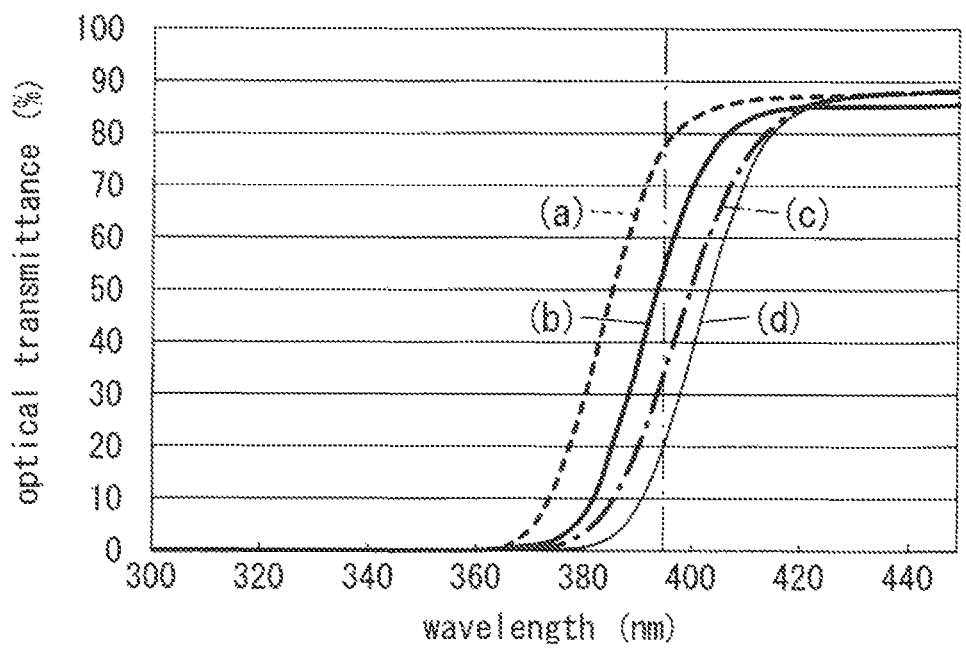
FIG. 6 is a graph illustrating an example of light-transmission characteristics of thermal adhesive films.

FIG. 6 is a graph illustrating another example of light-transmission property of the thermal adhesive film 5. In this graph, the horizontal axis shows light wavelength and the vertical axis shows optical transmittance. Curves denoted by (a) and (d) show optical transmittance of the thermal adhesive film 5 formed of resin whose main component is polyvinyl butyral. Curves denoted by (b) and (c) show optical transmittance of the thermal adhesive film 5 formed of resin whose main component is an ethylene-vinyl acetate copolymer. Each thickness of the films is 0.75 mm for (a) and (d), 0.8 mm for (b) and (c). The thermal adhesive film 5, of each of (a) and (b), has optical transmittance exceeding 50% at a wavelength of 395 nm. Light at a wavelength of 410 nm or less, specifically light at a wavelength of 395 nm (ultraviolet light) can pass through the photo-curable resin, which can be cured. Also, the thermal adhesive film 5, of each of (a) to (d) has optical transmittance below 10% at a wavelength of 365 nm. Therefore, an effect of cutting off ultraviolet light of short wavelength can be obtained. The reason that the thermal adhesive film 5 of each of (a) and (b) is more preferable than the thermal adhesive film 5 of each of (c) and (d) is similar to that described for FIG. 5.

When the members in the manufactured display device are bonded by using the thermal adhesive film 5, the structure thereof may be different from that when the members are bonded by an optical clear adhesive that has adhesiveness at room temperature. Also, the structure may be different from that when the members are bonded by coating an adhesive having fluidity. For example, in the case where the bonding is performed using the thermal adhesive film 5, it may be observed that, in an end portion of the overlaid films after bonding, end portion of respective films are not flush with each other, such that the thermal adhesive film 5 may extend outward a little than one of the transparent substrates 1, or the thermal adhesive film 5 is formed a little bit smaller than one of the transparent substrates 1. Also, it can be confirmed whether the the material of the adhesive layer originates from a film, an optical clear adhesive, or a resin having fluidity by analyzing the material. Therefore, bonding by the thermal adhesive film 5 can be confirmed by performing analysis.

Figure 7A:
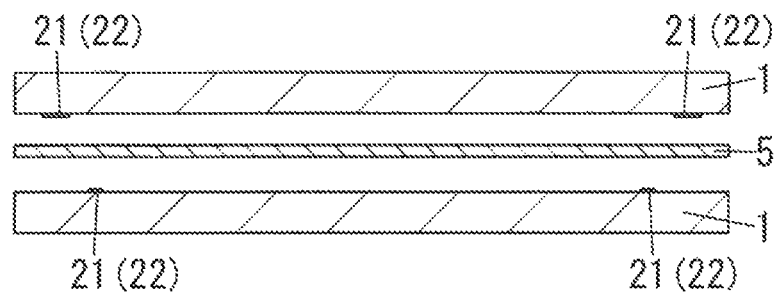
FIGS. 7A to 7C illustrate an example of the display device and the manufacturing method therefor, and are cross-sectional views.
Figure 7B:
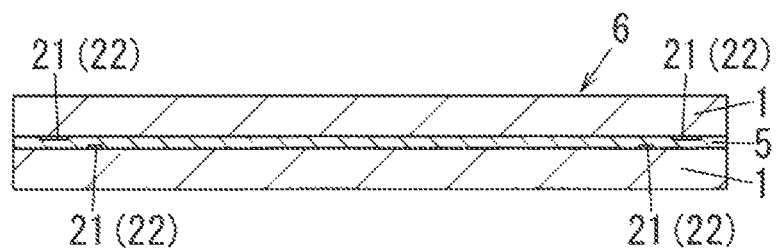
Figure 7C:
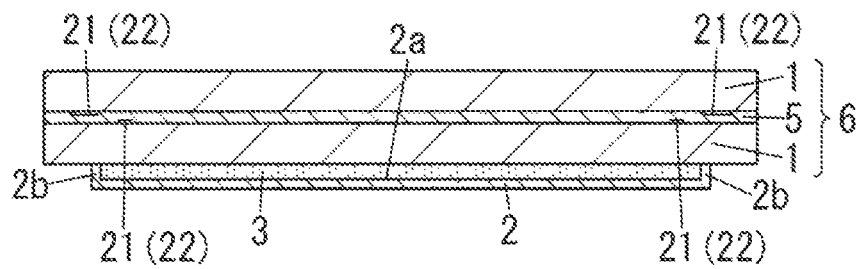

FIGS. 7A to 7D show another embodiment of a display device and manufacturing method therefor. FIGS. 7A and 7B illustrate a step that a transparent laminated body 6 is formed by two or more transparent substrates 1 being bonded with a thermal adhesive film 5. In FIG. 7C, the display device, which is formed by bonding the transparent laminated body 6 and an image-display body 2, is shown. In the case of the display device shown in FIGS. 7A to 7C, the transparent laminated body 6 has substances, which form a pattern, between two or more transparent substrates 1.

Therefore, design is improved. The same configuration as those of the embodiment described above is provided with the same reference numerals, and description thereof will be omitted.

In the preferable embodiment, the transparent laminated body 6 has substances, which form a pattern, between two or more transparent substrates 1. As a result of substances, which forms a pattern, existing between two or more transparent substrates 1, when the display device is viewed, this pattern can be seen, and thus the design can be formed of a pattern, and can be improved. Substances that form a pattern are defined as pattern substances 21.

In the example shown in FIGS. 7A to 7C, the pattern substances 21 are provided on surfaces of the transparent substrates 1. The pattern substances 21 may be composed of print layers 22, for example. In the case that the pattern substances 21 are composed of the print layers 22, a pattern that is well designed can be formed easily. The print layers 22 may be monochromatic, or be polychromatic, or have colors.

In FIGS. 7A to 7C, the print layers 22 are provided on a surface, on a side in which another transparent substrate 1 is stacked, of one transparent substrate 1. In FIGS. 7A to 7C, there are two transparent substrates 1, and the print layers 22 are provided on an inside surface of a transparent substrates 1 disposed outside, and an outside surface of a transparent substrate 1 disposed inside. Of course, the print layers 22 may be provided on an inside surface of the transparent substrate 1 disposed outside, or an outside surface of the transparent substrate 1 disposed inside. Here, in the case where the pattern substances 21 are provided on two or more transparent substrates 1, in order to suppress a gap of the pattern, overlaying the transparent substrates 1 with high accuracy is required. At that time, in the case where the boding is performed using the thermal adhesive film 5, two or more transparent substrates 1 can be overlaid with high positional accuracy. Therefore, a gap of the pattern can be suppressed efficiently. In this method, in the case where the print layers 22 are provided on both surfaces facing each other of two transparent substrates 1, the transparent substrates 1 can be bonded more efficiently with high positional accuracy, and the pattern can be formed. Note that, the print layers 22 may be provided on a surface of the side of the image-display body 2 of the transparent substrate 1 disposed inside. In this case, the print layers 22 are embedded in a resin layer 3. Furthermore, in the display device, the pattern substances 21 are not provided between the transparent substrates 1, and the pattern substances 21 are provided on a surface of the side of the image-display body 2 of the transparent substrate 1 disposed inside.

The pattern substances 21 may be provided in a frame-like shape so as to surround a portion in which an image is displayed by the image-display body 2, for example. In this case, for example, a pattern of a screen frame can be formed. As a result of an image being fitted inside the frame, design is improved. Of course, the pattern substances 21 may be provided so as to overlap with a display area to such a degree that an image display is not obstructed. In this case, the pattern can be provided and design can be improved, before the image display. Arrangement of the pattern substances 21 like this can be similarly applied that of the pattern substances 21 described in below embodiment.

Manufacturing the display device shown in FIGS. 7A to 7C can be performed by using a transparent substrate 1 having the print layers 22 as the pattern substances 21. For example, the pattern substances 21 can be provided on the transparent substrate 1 by printing the transparent substrate 1 before the transparent laminated body 6 being formed. The pattern substances 21 can be embedded in a layer of the thermal adhesive film 5 in forming the transparent laminated body 6. Bonding the transparent laminated body 6 and the image-display body 2, and forming the resin layer 3 can be performed by same method described in the above embodiment.

Figure 8A:
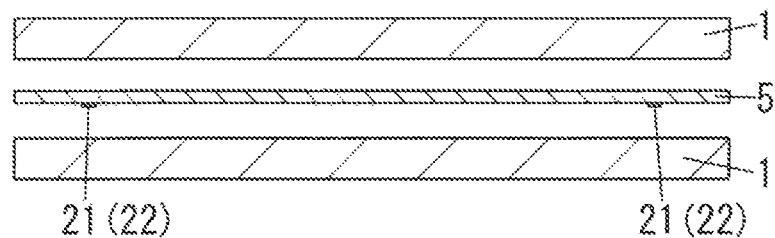
FIGS. 8A to 8C illustrate an example of the display device and the manufacturing method therefor, and are cross-sectional views.
Figure 8B:
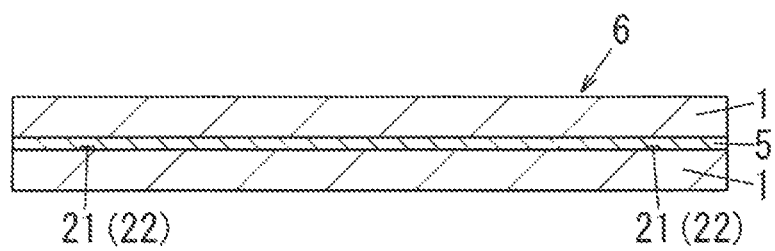
Figure 8C:
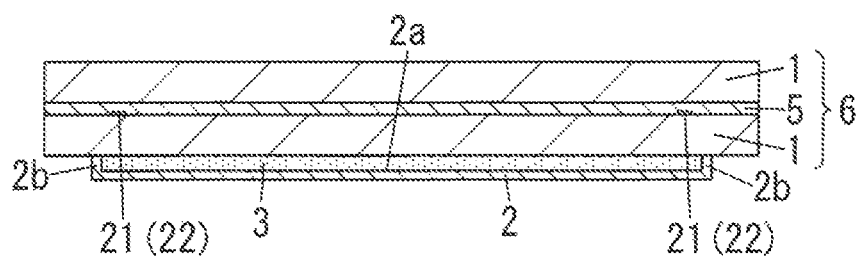

FIGS. 8A to 8C show another embodiment of a display device and manufacturing method therefor. FIGS. 8A and 8B illustrate a step that a transparent laminated body 6 is formed by two or more transparent substrates 1 being bonded with a thermal adhesive film 5. In FIG. 8C, the display device, which is formed by bonding the transparent laminated body 6 and an image-display body 2, is shown. In the case of the display device shown in FIGS. 8A to 8C, the transparent laminated body 6 has substances, which form a pattern, between two or more transparent substrates 1. Therefore, design is improved. The same configuration as those of the embodiment described above is provided with the same reference numerals, and description thereof will be omitted.

In an example shown in FIGS. 8A to 8D, pattern substances 21 are provided on a surface of the thermal adhesive film 5. The pattern substances 21 may be composed of print layers 22, for example. In the case where the pattern substances 21 are composed of the print layers 22, a pattern that is well designed can be formed easily. The print layers 22 may be monochromatic, or be polychromatic, or have colors.

In FIGS. 8A to 8C, the print layers 22 are provided on a surface, which overlaps a transparent substrate 1, of thermal adhesive film 5. In FIGS. 8A to 8C, there are two transparent substrates 1, and the layers 22 are provided on a surface of the thermal adhesive film 5 that faces a transparent substrate 1 disposed inside (a back of the thermal adhesive film 5). For example, the print layers 22 may not be provided on an inside surface of the thermal adhesive film 5, but be provided on outside surface of the thermal adhesive film 5. Also, the print layers 22 may be provided on both an outside surface of the thermal adhesive film 5 and an inside surface of the thermal adhesive film 5. In other words, the print layers 22 may be provided on at least one of an outside surface of the thermal adhesive film 5 and an inside surface of the thermal adhesive film 5. In this case, the design can be improved.

Manufacturing the display device shown in FIGS. 8A to 8C can be performed by using the thermal adhesive film 5 having the print layers 22 as the pattern substances 21. For example, the pattern substances 21 can be provided on the thermal adhesive film 5 by printing the thermal adhesive film 5 before the transparent laminated body 6 being formed. The pattern substances 21 can be embedded in a layer of the thermal adhesive film 5 in forming the transparent laminated body 6. Bonding the transparent laminated body 6 and the image-display body 2, and forming the resin layer 3 can be performed by the same method described in the above embodiment.

Figure 9A:
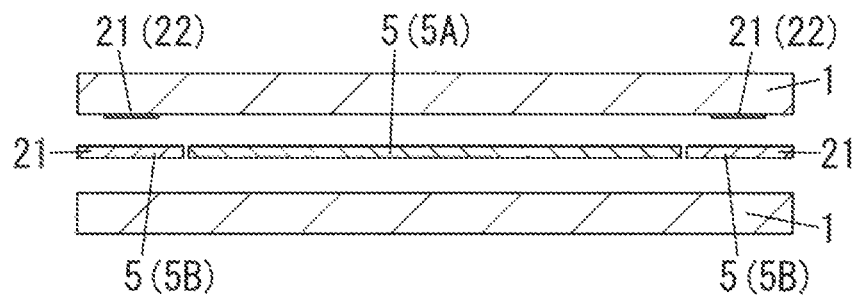
FIGS. 9A to 9C illustrate an example of the display device and the manufacturing method therefor, and are cross-sectional views.
Figure 9B:
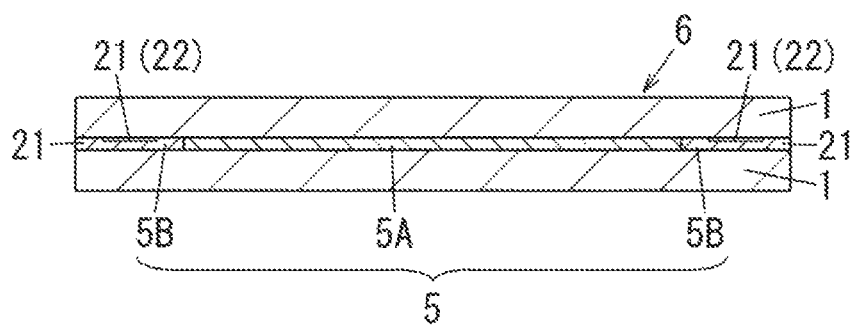
Figure 9C:
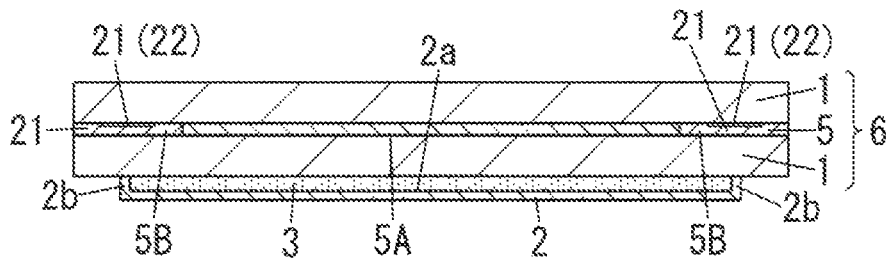

FIGS. 9A to 9C show another embodiment of a display device and a manufacturing method therefor. FIGS. 9A and 9B illustrate a step that a transparent laminated body 6 is formed by two or more transparent substrates 1 being bonded with a thermal adhesive film 5. In FIG. 9C, the display device, which is formed by bonding the transparent laminated body 6 and an image-display body 2, is shown. In the case of the display device shown in FIGS. 9A to 9C, the transparent laminated body 6 has substances, which form a pattern, between two or more transparent substrates 1. Therefore, design is improved. The same configuration as those of the embodiment described above is provided with the same reference numerals, and description will be omitted.

In an example shown in FIGS. 9A to 9C, a layer of the thermal adhesive film 5, which is sandwiched between the transparent substrates 1, is composed of multiple types of the thermal adhesive films 5. A first thermal adhesive film 5A is disposed at a central region, and a second thermal adhesive film(s) 5B is disposed at an edge region. The second thermal adhesive film(s) 5B may have a frame shape, and be disposed on a frame portion of one of the transparent substrates 1. The second thermal adhesive film(s) 5B may be composed of multiple long film members, or a film member having a frame shape, and, from the viewpoint of manufacturability, the former is preferable.

The first thermal adhesive film 5A may be composed of the thermal adhesive film 5 that become clear and colorless after thermal adhesion, for example. The second thermal adhesive film(s) 5B may be composed of the thermal adhesive film 5 that becomes clear and colored after thermal adhesion, for example. A color of the second thermal adhesive film(s) 5B after thermal adhesion may be an appropriate color such as milky, red, blue or green. Also, the color of the second thermal adhesive film(s) 5B after thermal adhesion may be translucent or not clear. As a result of the second thermal adhesive film(s) 5B being disposed at the edge region, even if transparency of this region is low, or this region is not clear, image can be displayed.

The second thermal adhesive film(s) 5B has pattern substances 21 internally. The pattern substances 21 embedded in the second thermal adhesive film(s) 5B is formed of substance for indicating an appropriate color. For example, the pattern substances 21 can be formed of pigment or the like. Therefore, in the case where the transparent substrates 1 are bonded with the thermal adhesive film 5, a pattern, derived from the second thermal adhesive film(s) 5B, can be formed.

Furthermore, in the example of FIGS. 9A to 9C, by print layers 22, the pattern substances 21 are provided on an inside surface of a transparent substrate 1 disposed outside. The print layers 22 may be the same ones as the above embodiments. In the transparent substrates 1 being bonded together and integrated, the pattern substances 21, formed of the print layers 22, are embedded in the second thermal adhesive film 5B. Note that, the layers 22 may not exist. In this case, by using multiple types of the thermal adhesive films 5, a pattern can be formed.

Manufacturing the display device shown in FIGS. 9A to 9C can be performed by using the thermal adhesive film(s) 5B, containing the pattern substances 21, and the thermal adhesive film 5A not containing the pattern substances 21. The transparent substrate 1 disposed outside may have the print layers 22. When manufacturing, such that the thermal adhesive films 5 are integrated when bonding, two or more thermal adhesive films 5 (the first thermal adhesive film 5A and the second thermal adhesive film(s) 5B) are arranged adjacent to each other. Two or more thermal adhesive films 5 are arranged in a planar. And, by heating and pressurization, two or more thermal adhesive films 5 are softened, and the transparent substrates 1 are bonded together and integrated. Integrated thermal adhesive films 5 form one adhesive layer. Bonding the transparent laminated body 6 with the image-display body 2 and forming the resin layer 3 can be performed by the same method as the above embodiments. In the case of using multiple types of the thermal adhesive films 5, by using thermal adhesion, a pattern can be formed easily.

Figure 10A:
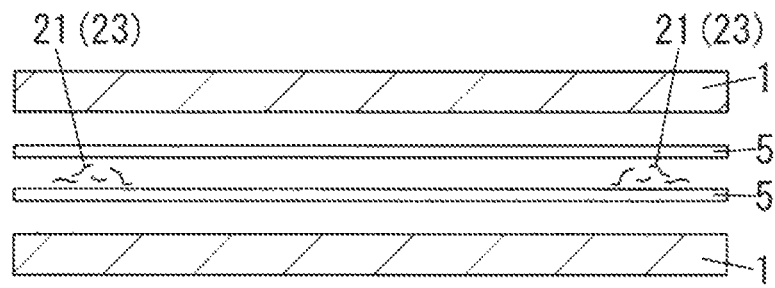
FIGS. 10A to 10C illustrate an example of the display device and the manufacturing method therefor, and are cross-sectional views.
Figure 10B:
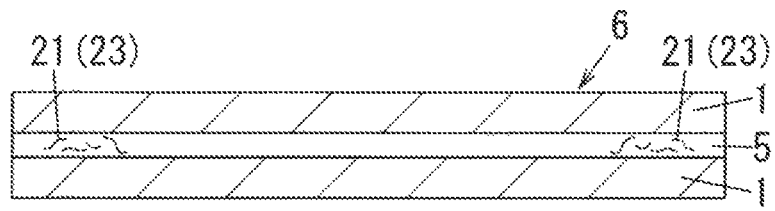
Figure 10C:
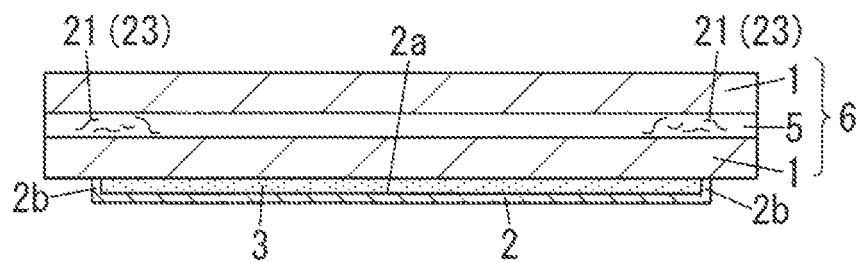

FIGS. 10A to 10C show another embodiment of a display device and manufacturing method therefor. FIGS. 10A and 10B illustrate a step that a transparent laminated body 6 is formed by two or more transparent substrates 1 being bonded with thermal adhesive films 5. In FIG. 10C, the display device, which is formed by bonding the transparent laminated body 6 and an image-display body 2, is shown. In the case of the display device shown in FIGS. 10A to 10C, the transparent laminated body 6 has substances, which forms a pattern, between two or more transparent substrates 1. Therefore, design is improved. The same configuration as those of the above embodiments is provided with the same reference numerals, and description thereof will be omitted.

In an example shown in FIGS. 10A to 10C, pattern substances 21 are provided between the thermal adhesive films 5. The pattern substances 21 can be composed of fibers 23, for example. In the case where the pattern substances 21 are composed of the fibers 23, a pattern that is well designed can be formed easily. As the fibers 23, short fibers are preferably used. The pattern substances 21 include multiple fibers 23. The fibers 23 may be composed of one type fiber, and may be composed of multiple types of fibers. The fibers 23 may be monochromatic, and may be multicolored. The fibers 23 may include inorganic fibers, and may include organic fibers. Also, the fibers 23 may include fibers derived from plants.

In FIGS. 10A to 10C, by bonding two transparent substrates 1 with two thermal adhesive films 5, the fibers 23 are provided between these two thermal adhesive films 5 as the pattern substance 21. As a result of the pattern substances 21 being provided between the thermal adhesive films 5, a pattern can be formed easily. Also, in the case where a pattern is composed of the fibers 23, because an ununiformly opaque pattern can be formed by using the fibers 23, refined and rich design like a Japanese paper can be formed.

Manufacturing the display device shown in FIGS. 10A to 10C can be performed by bonding the transparent substrates 1 with two or more thermal adhesive films 5 having the fibers 23, which are the pattern substances 21, therebetween. The fibers 23 can be disposed by sprinkling those on one of the thermal adhesive films 5, for example. In FIGS. 10A to 10C, although an example of the display device of which the pattern substances 21 are disposed at the edge, if there is no hindrance to the visibility of a screen, the pattern substances 21 may be disposed at the central region of the display device. For example, in the case of the pattern substances 21 that have transparency being disposed, because the image can be seen even if the image overlaps a pattern, design due to a pattern can be obtained. The pattern substances 21 can be embedded in a layer of the thermal adhesive films 5 that are bonded together and integrated when forming the transparent laminated body 6. In FIG. 10C, the thermal adhesive films 5 are bonded together and integrated, in order to express this, a boundary line of the thermal adhesive films 5 arranged in layers is not shown. Integrated thermal adhesive films 5 compose one adhesive layer. Bonding the transparent laminated body 6 with the image-display body 2 and forming a resin layer 3 can be performed by the same method as the above embodiments.

By the way, in FIGS. 10A to 10C, although the fibers 23 are explained as the pattern substances 21 that are sandwiched between the thermal adhesive films 5, not only the fibers 23 but also various substances can be used as the pattern substances 21 that are sandwiched between the thermal adhesive films 5. For example, a vegetative piece of a leaf, a flower and the like as well as a paper can be exemplified. In short, since thin crumbling can be held by being inserted between the thermal adhesive films 5, crumbling can be used as the pattern substances 21. In the case of above thermal adhesive films 5 being used, since the pattern substances 21 can be disposed in a state in which the thermal adhesive films 5 do not express adhesiveness, alignment of a pattern can be performed more easily.

Figure 11A:
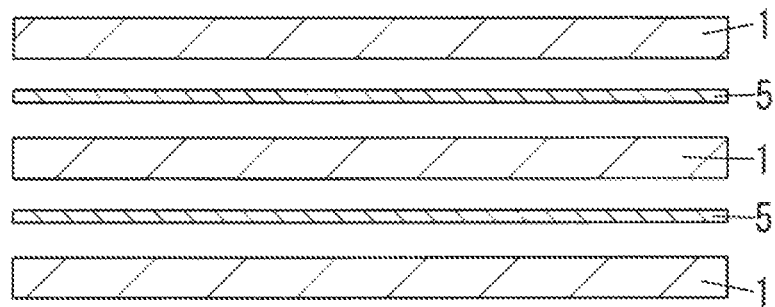
FIGS. 11A to 11C illustrate an example of the display device and the manufacturing method therefor, and are cross-sectional views.
Figure 11B:
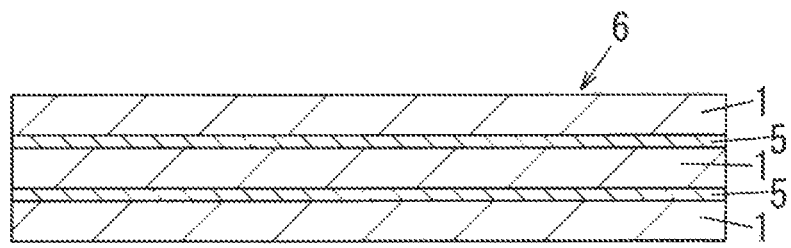
Figure 11C:
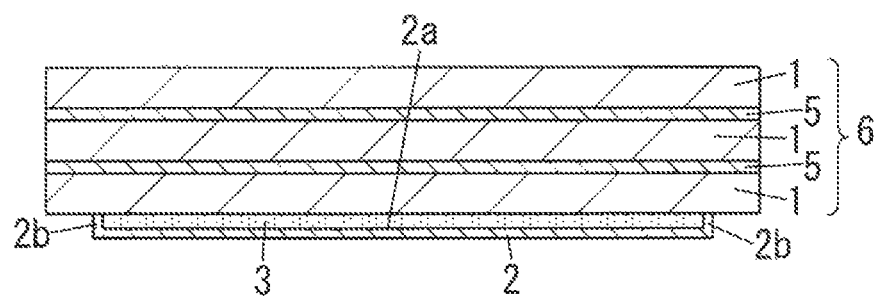

FIGS. 11A to 11C show another embodiment of a display device and a manufacturing method therefor. FIGS. 11A and 11B illustrate a step that a transparent laminated body 6 is formed by two or more transparent substrates 1 being bonded with thermal adhesive films 5. In FIG. 11C, the display device, which is formed by bonding the transparent laminated body 6 and image-display body 2, is shown. In the case of the display device shown in FIGS. 11A to 11C, the transparent laminated body 6 is composed of three transparent substrates 1. The same configuration as those of the above embodiments is provided with the same reference numerals, and description thereof will be omitted.

The number of the transparent substrates 1 that are included in the transparent laminated body 6 may be 3 or more. In an example shown in FIGS. 11A to 11C, the transparent laminated body 6 is composed of three transparent substrates 1. Each of the transparent substrates 1 is bonded with the thermal adhesive films 5 sandwiched therebetween. The number of the transparent substrates 1 composing the transparent laminated body 6 may be 4 or more, as well as 5 or more, of course. Upper limit of the number of transparent substrates 1 composing the transparent laminated body 6 is not limited, for example, from the viewpoint of manufacturability, the number of the transparent substrates 1 may be 10 or less.

The thermal adhesive films 5 are provided between the transparent substrates 1, in FIGS. 11A to 11C, two thermal adhesive films 5 are used. That is, the number of the thermal adhesive films 5 may be smaller by 1 than that of the transparent substrates 1. Note that, like the example of FIGS. 9A to 9C, multiple types of the thermal adhesive films 5 may be provided between transparent substrates 1 in a planar manner, or like the example of FIGS. 10A to 10C, two or more thermal adhesive films 5 may be arranged in layers, between the transparent substrates 1. In this case, the number of layers formed of the thermal adhesive films 5 may be smaller by 1 than that of the transparent substrates 1.

In the case where the number of the transparent substrates 1, composing the transparent laminated body 6, is three or more, strength of the transparent laminated body 6 can be improved, and protection of the device can be improved. For example, the transparent laminated body 6 may be formed by layering the transparent substrates 1 formed of resin like polycarbonate, and a laminated glass composed of two glasses. In this case, the transparent substrates 1 formed of resin can be disposed outside. Also, the transparent laminated body 6 may be composed of multiple-glass composed of three or more glasses bonded each other.

The transparent laminated body 6 may include substances, which form a pattern, between two or more transparent substrates 1. In this case, design can be improved. The pattern can be formed of pattern substances 21. An embodiment, where a pattern is formed, may be similar to those of the above embodiments. For example, a pattern can be formed by being printed on at least one of a transparent substrate 1 and a thermal adhesive film 5, mixing crumbling like fibers 23, and using multiple types of the thermal adhesive films 5.

In the case of using three transparent substrates 1, a spacer between the transparent substrates 1 includes two spacers composed of a spacer provided outside and a spacer provided inside. In this case, by superposing an outside pattern of a spacer between the transparent substrates 1 and an inside pattern of a spacer between the transparent substrates 1, a whole pattern may be formed. For example, as a result of print layers 22 being provided between two or more transparent substrates 1, and a pattern being provided at portions, of the transparent laminated body 6, having different thickness, a pattern having solidity can be formed, and design can be improved.

In the case where a pattern is provided at portions, of the transparent laminated body 6, having different thickness, a different pattern substance 21 may be provide at a portion having different thickness. For example, by one of the fibers 23 being provided in an outside spacer between the transparent substrates 1, one of the print layers 22 being provide in an inside spacer between the transparent substrates 1 and these patterns being superposed, the whole pattern can be formed.

In the case where the transparent laminated body 6 is composed of three or more transparent substrates 1, the transparent substrates 1 need to be arranged in layers with higher accuracy in comparison with the case where it is composed of two transparent substrates 1. Especially, in the case where the pattern substances 21 are provided between two or more transparent substrates 1, positioning, stacking and integrating are important in order to prevent the occurrence of gap in the pattern in a vertical direction. As a result of using the above thermal adhesive films 5, it is possible to stack and bond the transparent substrates 1 and thermal adhesive films 5 with high positional accuracy. Therefore, it is possible to form the display device with less positional displacement of the pattern and members and that is well designed.

Manufacturing the display device shown in FIGS. 11A to 11C can be performed by bonding three or more transparent substrates 1 to transparent substrates 1 with the thermal adhesive film 5 intervened therebetween. In the case of using the pattern substances 21, by the similar method describe above, the pattern substances 21 may be provided between the transparent substrates 1. Bonding the transparent laminated body 6 and the image-display body 2, and forming a resin layer 3 can be performed by the same method described in the above embodiments.

Figure 12:
FIG. 12 is a cross-sectional view illustrating an example of a touch-sensor-equipped display device.

FIG. 12 shows another embodiment of a display device. This display device includes a touch sensor 10 on a surface, which faces an image-display body 2, of a transparent laminated body 6. Other constitution may be the same as the display device shown in FIGS. 1A and 1B. The same configuration as those of the above embodiments is provided with the same reference numerals, and description thereof will be omitted.

In the preferable embodiment, the display device includes touch sensor 10. In this case, the display device constitutes a touch-sensor-equipped display device. As a result of using touch sensor 10, by a touch material such as a finger or a touch pen touching a surface of the transparent laminated body 6, input process can be performed, and operability can be improved.

The touch sensor 10 is preferably an electrostatic capacitance type sensor. The touch sensor 10 preferably transmits light of a wavelength that causes the photo-curable resin to be cured. A supporting substance of the touch sensor 10 may be the transparent laminated body 6. The touch sensor 10 can be composed of two paired electrode layers that are composed of conduct lines having electrical conductivity and that are stacked in the thickness direction.

Manufacturing the touch sensor equipped display device shown in FIG. 12 can be performed by forming the transparent laminated body 6 using two or more transparent substrate 1, and forming the touch sensor 10 by using this transparent laminated body 6 as the supporting substrates. Forming the touch sensor 10 on a surface of the transparent laminated body 6 can be performed by bonding substrates supporting electrodes of the touch sensor 10 and the transparent laminated body 6 with a thermal adhesive film 5, for example. Here, two substrates that support respective two types electrodes may be bonded at the same time with the thermal adhesive film 5. Bonding the transparent laminated body 6 and an image-display body 2 can be performed by the same method described above. Heating and pressurizing can be performed by by vacuum pressing. In this method, since the transparent substrate 1 is used, the touch sensor 10 can be easily formed with high positional accuracy. Also, when the thermal adhesive film 5 allows light of a wavelength with which the photo-curable resin is cured to pass through, more preferably when the optical transmittance at a wavelength of 395 nm is 50% or more and the optical transmittance at a wavelength of 365 nm is 10% or less, the resin layer 3 can be easily formed by curing the photo-curable resin. Accordingly, a touch-sensor-equipped display device can be easily formed.

In the manufacturing the touch-sensor-equipped display device shown in FIG. 12, the transparent laminated body 6 and the touch sensor 10 may be formed at the same time. For example, two or more transparent substrate 1 and two or more substrates that support the electrodes are stacked with the thermal adhesive film 5 located therebetween, and heating and pressurization can be performed thereon. In this case, the thermal adhesive film 5 located between the members express adhesiveness, and the transparent laminated body 6 and the touch sensor 10 are formed at the same time. In this method, since the transparent laminated body 6 and the touch sensor 10 can be formed at the same time, manufacturing can be performed efficiently. In this case also, as a result of using the thermal adhesive film 5 that does not have adhesiveness before being heated, adhesiveness with high positional accuracy can be provided. Also, as a result of using the thermal adhesive film 5 described above, the photo-curable resin can be cured.

Each display device according to the embodiments described above can be used as a display device such as a display and can be used in various application. For example, the display device can be attached on a wall, or can be attached to furniture. In such a case, it is preferable to form an embedded type display device. The display device enables display of an image in a large screen, and the display device is attached to an architectural structure or furniture, whereby the design thereof can be improved.

The invention claimed is:
1. A display device comprising:
a transparent laminated body formed of transparent substrates that are arranged in layers;
an image-display body that faces the transparent laminated body; and
a resin layer that is disposed between the transparent laminated body and the image-display body and is made of a photo-curable resin, wherein
the transparent substrates are bonded with a thermal adhesive film, and the thermal adhesive film has optical transmittance of 50% or more at wavelength of 395 nm and optical transmittance of 10% or less at wavelength of 365 nm.

2. The display device according to claim 1, wherein the transparent laminated body has substance, which forms a pattern, between transparent substrates.

3. The display device according to claim 1 or 2, wherein the thermal adhesive film comprises at least one of an ethylene-vinyl acetate copolymer and polyvinyl butyral as a main component and an ultraviolet absorbent.

4. A display device manufacturing method comprising:
a transparent substrate disposition step in which transparent substrates are disposed in layers with a thermal adhesive film, having optical transmittance of 50% or more at wavelength of 395 nm, located therebetween;
a bonding step in which the transparent substrates are bonded by heating and pressurization and a transparent laminated body are formed; and
a resin curing step in which the transparent laminated body and an image-display body are stacked in layers with a photo-curable resin located between the transparent laminated body and the image-display body, and the photo-curable resin is cured by being provided with light from a side of the transparent laminated body.

5. The display device manufacturing method according to claim 4, wherein
the thermal adhesive film comprises at least one of an ethylene-vinyl acetate copolymer and polyvinyl butyral as a main component and an ultraviolet absorbent, and
the light with which is provided in the resin curing step has a peak wavelength of 390 to 410 nm.

6. The display device according to claim 2, wherein
the thermal adhesive film comprises at least one of an ethylene-vinyl acetate copolymer and polyvinyl butyral as a main component and an ultraviolet absorbent.

* * * * *